(No Model.)
W. C. BLILER.
HOG SNOUT CUTTER.
No. 323,261. Patented July 28, 1885.
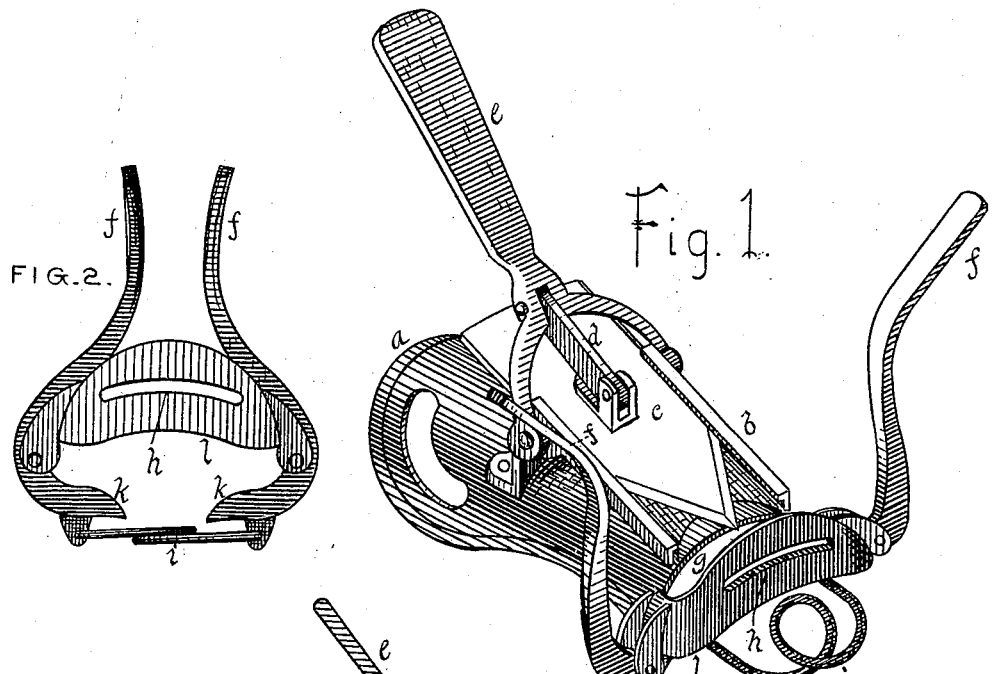
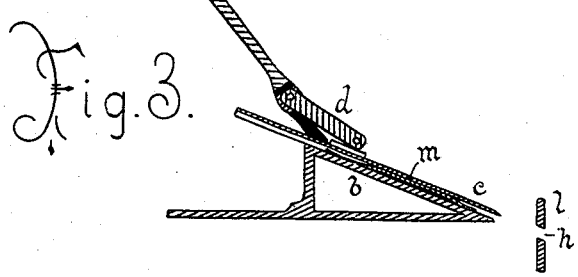
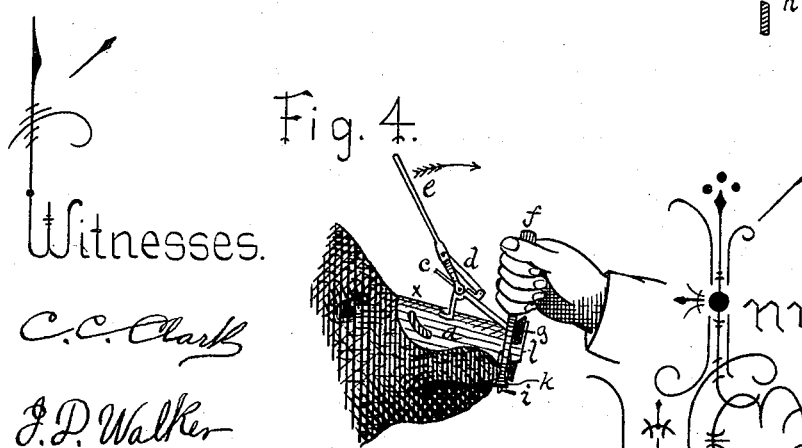
Witnesses
C. C. Clark
J. P. Walker
Inventor
W. C. Bliler
By L. P. Graham
atty.

UNITED STATES PATENT OFFICE.

WILLIAM C. BLILER, OF DECATUR, ILLINOIS.

HOG-SNOUT CUTTER.

SPECIFICATION forming part of Letters Patent No. 323,261, dated July 28, 1885.

Application filed March 21, 1885. (No model.)

*To all whom it may concern:*

Be it known that I, WILLIAM C. BLILER, a resident of the city of Decatur, county of Macon, and State of Illinois, have invented certain new and useful Improvements in Hog-Snout Cutters, of which the following is a specification.

My invention consists in certain details of construction and combinations of parts, as hereinafter set forth and claimed.

In the drawings accompanying and forming a part of this specification, Figure 1 is a perspective view of my device. Fig. 2 is an elevation of the front part of the same. Fig. 3 is a central longitudinal vertical section of the implement, and Fig. 4 shows the manner of placing the same in position on the hog's snout.

$a$ is a frame adapted by size and conformation to fit over the top of a hog's snout. $b$ is a guide for the V-shaped knife $c$. $d$ is a bar that connects knife $c$ with lever $e$. $ff$ are a pair of opposing levers pivoted to frame $a$ and provided with jaws $k$ $k$. $l$ is a vertical formation on frame $a$, that presses against the end of the hog's snout. $h$ is a slot in vertical plate $l$, of suitable size and conformation to receive knife $c$. $g$ is an opening in frame $a$, through which the cartilaginous portion of the hog's snout passes. $m$, in Fig. 3, is a friction-spring that holds knife $c$ in the position shown.

The lever $e$ is bifurcated at its lower end and pivoted on guide-frame $b$.

The spring $i$ tends to hold levers $ff$ in the position shown in Fig. 1.

The rear end of the knife-guide is elevated, as shown, in order to make the slit in the hog's snout at such an inclination that the cut portion will drop down in front, and not lie in position to grow fast again.

The levers $ff$ are adjusted to permit the jaws $k$ $k$ to fit under the fleshy part of the hog's upper jaw, in front of the teeth, and by the operation of spring $i$ to force the upper cartilaginous portion through opening $g$.

Knife $c$ should be of suitable size to make a broad slit through a hog's snout without entirely disconnecting the cut portion; and in using the implement on a small pig the knife need not be inserted to its greatest width.

In operation, the levers $ff$ are compressed by the right hand into the position shown in Fig. 2, and the implement placed on a hog's snout, as indicated in Fig. 4. The left hand is then placed on frame $a$ at the position indicated by $x$ in Fig. 4, and the right hand detached from levers $ff$. When pressure is released from levers $ff$, jaws $k$ $k$ force the cartilaginous portion of the snout into opening $g$, and the operation is completed by throwing lever $e$ around in the direction indicated by the arrow, thereby forcing the knife through the cartilage and effectually destroying its rooting capacity.

The device is removed from the hog's snout by reversing the above described operation, throwing lever $e$ back into the position shown and recompressing levers $ff$ with the right hand.

In operating the knife, plate $l$ holds the snout firmly in position and assists in making the operation accurate.

It will be seen that by using my device the slit will be made uniformly in the same position through the snout, and that under no circumstances can the knife come in contact with the bone.

I claim as new and desire to secure by Letters Patent—

1. In hog-snout cutters, the combination of a concave frame, a knife adapted to slide longitudinally thereon, and a pair of opposed bent levers pivoted to the frame at right angles therewith, as and for the purpose set forth.

2. In hog-snout cutters, the combination of a concave frame, a knife-guide oblique therewith, a knife adapted to slide longitudinally in the knife-guide, and a pair of opposing bent levers pivoted to the frame at right angles therewith, as and for the purpose set forth.

3. The combination, in a hog-snout cutter, of frame $a$, provided with opening $g$, guide $b$, knife $c$, lever $e$, connecting-bar $d$, vertical plate $l$, provided with slot $h$, levers $ff$, terminating in jaws $k$ $k$, and a suitable spring for compressing said jaws, all constructed and arranged to operate substantially as and for the purpose set forth.

In testimony whereof I sign my name in the presence of two subscribing witnesses.

WILLIAM C. BLILER.

Attest:
I. D. WALKER,
L. P. GRAHAM.